(12) United States Patent
Liu

(10) Patent No.: US 11,970,166 B2
(45) Date of Patent: Apr. 30, 2024

(54) SPEED GENERATION IN CAUTIOUS DRIVING FOR AUTONOMOUS VEHICLES

(71) Applicant: Beijing Voyager Technology Co., Ltd., Beijing (CN)

(72) Inventor: Yue Liu, San Jose, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 161 days.

(21) Appl. No.: 17/558,816

(22) Filed: Dec. 22, 2021

(65) Prior Publication Data

US 2023/0192082 A1  Jun. 22, 2023

(51) Int. Cl.
*B60W 30/14* (2006.01)
*B60W 30/16* (2020.01)
*B60W 40/04* (2006.01)
*B60W 40/105* (2012.01)
*B60W 60/00* (2020.01)

(52) U.S. Cl.
CPC .......... *B60W 30/143* (2013.01); *B60W 30/16* (2013.01); *B60W 40/04* (2013.01); *B60W 40/105* (2013.01); *B60W 60/0015* (2020.02); *B60W 2554/4041* (2020.02); *B60W 2554/4042* (2020.02); *B60W 2554/4045* (2020.02); *B60W 2554/80* (2020.02); *B60W 2555/60* (2020.02)

(58) Field of Classification Search
CPC .... B60W 30/143; B60W 30/16; B60W 40/04; B60W 40/105; B60W 60/0015; B60W 2554/4041; B60W 2554/4042; B60W 2554/4045; B60W 2554/80; B60W 2555/60; B60W 30/18163
See application file for complete search history.

(56) References Cited

U.S. PATENT DOCUMENTS

| | | | |
|---|---|---|---|
| 2013/0297196 A1* | 11/2013 | Shida | B60W 40/04 701/119 |
| 2014/0292545 A1* | 10/2014 | Nemoto | G08G 1/163 340/988 |
| 2015/0203107 A1* | 7/2015 | Lippman | B60W 30/00 701/23 |
| 2018/0033308 A1* | 2/2018 | Litkouhi | G05D 1/0268 |

* cited by examiner

*Primary Examiner* — Isaac G Smith
*Assistant Examiner* — Nikki Marie M Molina
(74) *Attorney, Agent, or Firm* — WHDA, LLP

(57) ABSTRACT

Cautious driving and cautious driving speed determination for an autonomous vehicle is responsive to receiving a non-yield backup prediction for the vehicle regarding a traffic participant in a region of interest in a road network surrounding the vehicle, the non-yield backup prediction including a non-yield probability value for the traffic participant not yielding to the vehicle. Driving information, including speed, for other traffic participants within the region of interest is obtained from a sensor system, and an average speed of the other traffic participants is determined. A driving system determines a cautious driving speed for the vehicle by calculating a reverse probability value, which is a reverse percentage of the non-yield probability value relative to a maximum value for it, and multiplying the average speed of the other traffic participants by the reverse probability value. The driving system controls the vehicle to reduce its speed to the cautious driving speed.

18 Claims, 11 Drawing Sheets

SPEED GENERATION IN CAUTIOUS DRIVING FOR AUTONOMOUS VEHICLES

BACKGROUND

Vehicles that provide driver-assist functionality and/or automated or autonomous vehicles (AVs) operate with a fully or highly automated driving system. Such driving systems obtain and process sensor data regarding a vehicle's environment on the road to traverse a planned route from a current position to a target position with minimal or no input from a human driver. In traversing the planned route, the driving system accounts for various objects derived from the sensor data in order to safely execute maneuvers with the vehicle to avoid contact with the objects, such as other vehicles, pedestrians, obstacles, and various other things encountered on the road. For safety and efficiency, the driving system determines and implements cautious driving by taking account of the objects and a predicted future behavior of the objects.

In determining and implementing cautious driving, the driving system is designed to be as cautious as possible, especially in terms of speed control and slowing down in various scenarios. However, slowing down may sometimes run into an imbalance with real world human driving expectations. For instance, cautious driving by the autonomous vehicle may lead to a human driver of another vehicle behind the autonomous vehicle to rear end the autonomous vehicle when that human driver does not discern anything that should be causing a slow down based on human driving expectations. Cautious driving by the autonomous vehicle, such as slowing down at an intersection, may sometimes lead to traffic congestion and the frustration of human drivers stuck behind the autonomous vehicle because human drivers might not discern any reason for the slow down based on human driving expectations. The struggle technologically is in how the driving system can properly balance between safety and real-world human expectations in order to drive safely.

SUMMARY

To achieve a better balance between safety in cautious driving by an autonomous vehicle and real-world human driving expectations, embodiments of the present application technologically improve upon the implementation of cautious driving speed determination in the related art.

In one aspect of the present application, a computer-implemented method for autonomous driving and an autonomous vehicle receives, from a driving system including one or more hardware processors onboard an autonomous vehicle, a non-yield backup prediction for the vehicle regarding a traffic participant in a region of interest in a road network surrounding the vehicle, the non-yield backup prediction including a non-yield probability value for the traffic participant not yielding to the vehicle. Driving information, including speed, for other traffic participants surrounding the vehicle within the region of interest is obtained from a sensor system onboard the vehicle, and an average speed of the other traffic participants is determined by the driving system. The driving system determines a cautious driving speed for the vehicle based on the non-yield probability value and the average speed of the other traffic participants. This determination of the cautious driving includes calculating a reverse probability value (a reverse percentage of the non-yield probability value relative to a maximum value for the non-yield probability value) and multiplying the average speed of the other traffic participants by the reverse probability value. When the vehicle is traveling greater than the cautious driving speed, the driving system controls the vehicle to reduce the speed of the vehicle to the cautious driving speed.

In another aspect of the present application, after the cautious driving speed is determined, the driving system further determines that the other traffic participants are accelerating and increases the cautious driving speed by a preset percentage.

In yet another aspect of the present application, after the cautious driving speed is determined, the driving system further determines that the other traffic participants are decelerating and decreases the cautious driving speed by a preset percentage.

In a further aspect of the present application, after the cautious driving speed is determined, the driving system further determines that at least one of the other traffic participants is positioned in front of the vehicle, with a distance between the at least one of the other traffic participants and the vehicle being equal to or less than a threshold distance, and decreases the cautious driving speed by a preset percentage.

In another aspect of the present application, after the cautious driving speed is determined, the driving system further determines that at least one of the other traffic participants in an adjacent lane is making a lane change into a lane the vehicle is located and in front of the vehicle, and decreases the cautious driving speed by a preset percentage.

In yet another aspect of the present application, with the average speed of the other traffic participants being greater than a maximum driving speed of the vehicle or greater than a speed limit for a roadway the vehicle is located, the average speed is modified, by the driving system, to be the lesser of the maximum driving speed and the speed limit.

In these aspects of the present application and the various embodiments described herein, a cautious driving reasoner modifies the limited implementation logic in the related art to utilize both an average speed of other traffic participants surrounding the autonomous vehicle within the region of interest and the non-yield probability value associated with a non-yield backup prediction generated by a prediction module in the driving system for the autonomous vehicle. The non-yield backup prediction by a prediction module received by a planning module in the driving system triggers the cautious driving reasoner to determine a cautious driving speed that ultimately causes the driving system to control a speeding vehicle to reduce its speed to the cautious driving speed due to the non-yield backup prediction. While the limited cautious driving speed determination of the related art may simply use a default or preset cautious driving speed value, the present application determines an average speed for other traffic participants in the region of interest surrounding the vehicle and determines the cautious driving speed to be the average speed of other traffic participants multiplied by a reverse probability value (a reverse percentage of the non-yield probability value relative to a maximum value for the non-yield probability value). Accordingly, the vehicle is reduced to a more balanced cautious driving speed. This technological solution for cautious driving speed determination reflects an improvement in autonomous cautious driving technology.

Additional aspects of the present application and other embodiments described herein go further to better balance autonomous cautious driving and real-world human driving expectations by fine-tuning the cautious driving speed determination. Such fine-tuning includes increasing or decreasing the determined cautious driving speed based on additional implementation logic addressing acceleration or deceleration of other traffic participants surrounding the autonomous vehicle, addressing distance between the autonomous vehicle and other traffic participants in front of the vehicle, addressing a lane change for a traffic participant entering the vehicle's lane in front of the vehicle, addressing other scenario specific parameters, and/or any combination of such considerations. Each of these fine-tuning technological solutions for cautious driving speed determination further reflects an improvement in autonomous cautious driving technology.

BRIEF DESCRIPTION OF THE DRAWINGS

To describe the technical solutions in the embodiments of the present application more clearly, the following briefly describes the accompanying drawings used in describing the embodiments. The accompanying drawings in the following description show merely some embodiments of the present invention, and a person of ordinary skill in the art may envision and/or derive other drawings from these accompanying drawings.

DETAILED DESCRIPTION OF ILLUSTRATIVE EMBODIMENTS

Figure 1:
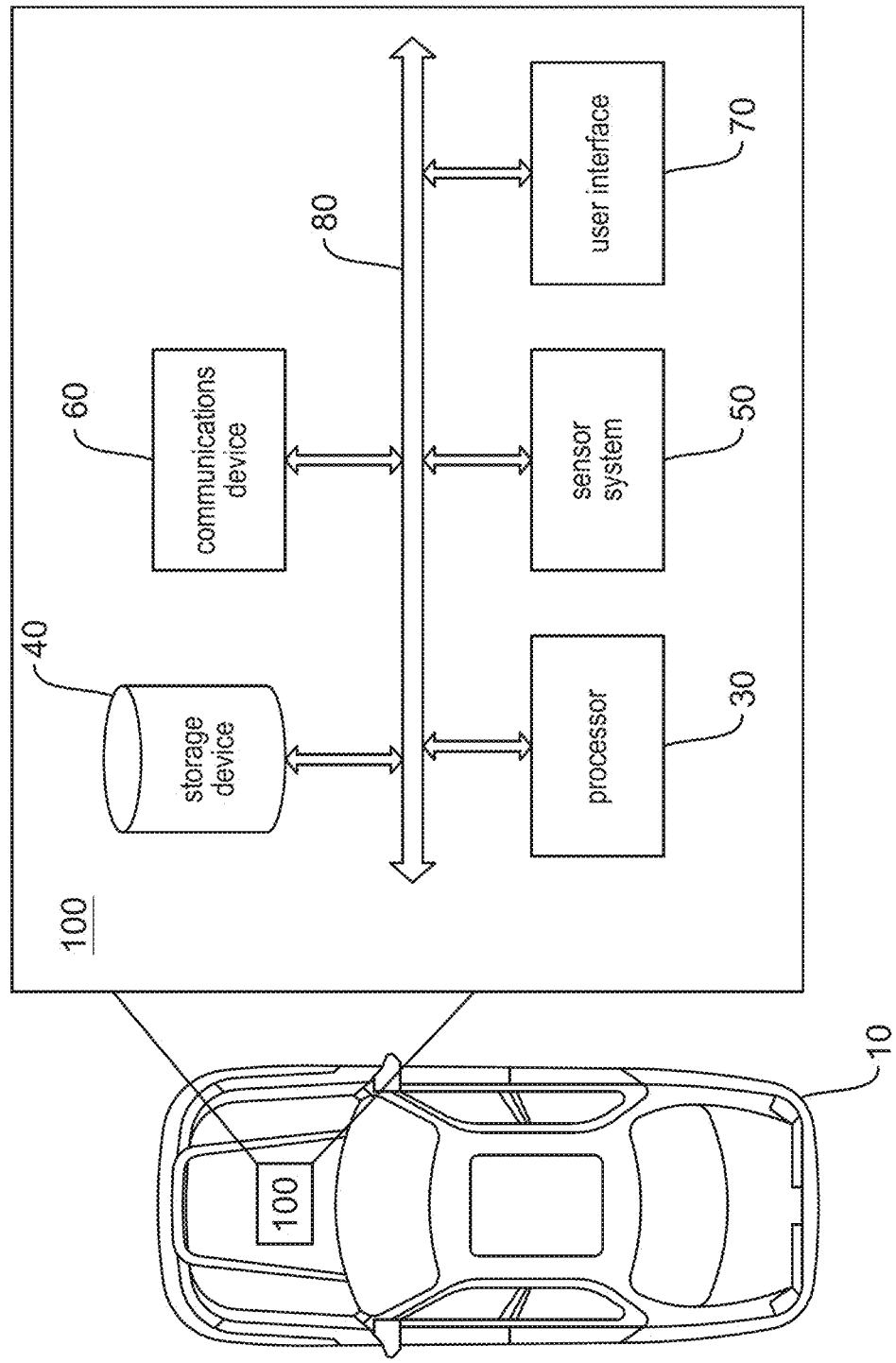
FIG. 1 illustrates an overview of a driving system for a highly or fully autonomous vehicle according to an embodiment of the present disclosures.

This disclosure relates to a technological improvement in the implementation of cautious driving in driving systems for fully or highly automated driving systems. FIG. 1 shows a driving system 100 provided in a fully or highly automated vehicle 10.

The vehicle 10 can be a regular gasoline, natural gas, biofuel, electric, hydrogen, etc. vehicle configured to offer ridesharing and/or other location-based services, a vehicle that provides driver-assist functionality, and/or an automated or autonomous vehicle. The vehicle can be an automobile, truck, van, bus, motorcycle, scooter, bicycle, and/or any other motorized vehicle, or hybrid thereof.

The driving system 100 may be implemented by a combination of firmware and software installed in the vehicle. The driving system 100 may be implemented as functional circuitry within hardware devices. The driving system 100 may be implemented in any combination of hardware devices and software components. As shown in FIG. 1, the firmware or hardware devices may include a processor 30, a storage device 40, a sensor system 50, a communications device 60, a user interface 70, and other devices connected via a bus 80.

The processor 30 may include one or more processors, one or more multicore processors, and/or one or more circuits. The processor 30 may be configured with instructions retrieved from the storage device to provide one or more of the functions of the modules, sub-modules, and services described in the present application and described using terms set forth in the claims below. As such, the functions of, or any part of the functions of, the modules, sub-modules, and services described in the present application, and using terms such as those set forth in the claims below, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices. The functions of, or any part of the functions of, the modules, sub-modules, and services described in the present application, and using terms such as those set forth in the claims below, may also be partially or fully configured in circuits and/or circuitry of an electronic device.

The processor 30 may also include one or more of a microprocessor, a central processing unit (CPU), an electronic control unit (ECU), a complex instruction set computing (CISC) microprocessor, a reduced instruction set computing (RISC) microprocessor, a very long instruction word (VLIW) microprocessor, an application specific integrated circuit (ASIC), a cellular or baseband processor, a field programmable gate array (FPGA), a digital signal processor (DSP), an arithmetic and control unit (ACU), a network processor, a graphics processor, a communications processor, a cryptographic processor, a co-processor, an embedded processor, or a processor implementing dedicated instruction sets or other instruction sets.

The storage device 40 is a non-transitory computer readable medium. A machine-readable medium includes any mechanism for storing information in a form readable by a machine (e.g., a computer or processor). For example, a machine-readable (e.g., computer-readable) medium includes a machine (e.g., a computer) readable storage medium (e.g., read only memory ("ROM"). random access memory ("RAM"), magnetic disk storage media, optical storage media, flash memory devices, and the like).

The communications device 60 allows communication between the vehicle 10 and external systems, such as devices, sensors, other vehicles, networks, etc. Although one vehicle 10 is shown in FIG. 1, multiple autonomous vehicles can be coupled to each other and/or coupled to servers over a network. The network may be any type of network such as a local area network (LAN), a wide area network (WAN) such as the Internet, a cellular network, a satellite network, or a combination thereof, wired or wireless. Server(s) may be any kind of servers or a cluster of servers, such as Web or cloud servers, application servers, backend servers, or a combination thereof. Server(s) include data analytics servers, content servers, traffic information servers, map and point of interest (MPOI) servers, or location servers, etc. The communications device 60 may also wirelessly communicate with one or more devices directly or via a communications network. A wireless communication system can use any cellular communication network or a wireless local area network (WLAN), e.g., using WiFi to communicate with another component or system. The communications device 60 could also communicate directly with a device (e.g., a mobile device of a passenger, a display device, a speaker within the vehicle 10), for example, using an infrared link, Bluetooth, etc.

The user interface 70 may be part of peripheral devices implemented within vehicle 10 including, for example, a keyboard, a touch screen display, a microphone, and a speaker, etc.

The components of the driving system 100 shown in FIG. 1 may be communicatively coupled to each other via the bus 80, an interconnect, a network, or a combination thereof. The bus 80 may also be a controller area network (CAN) bus which is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
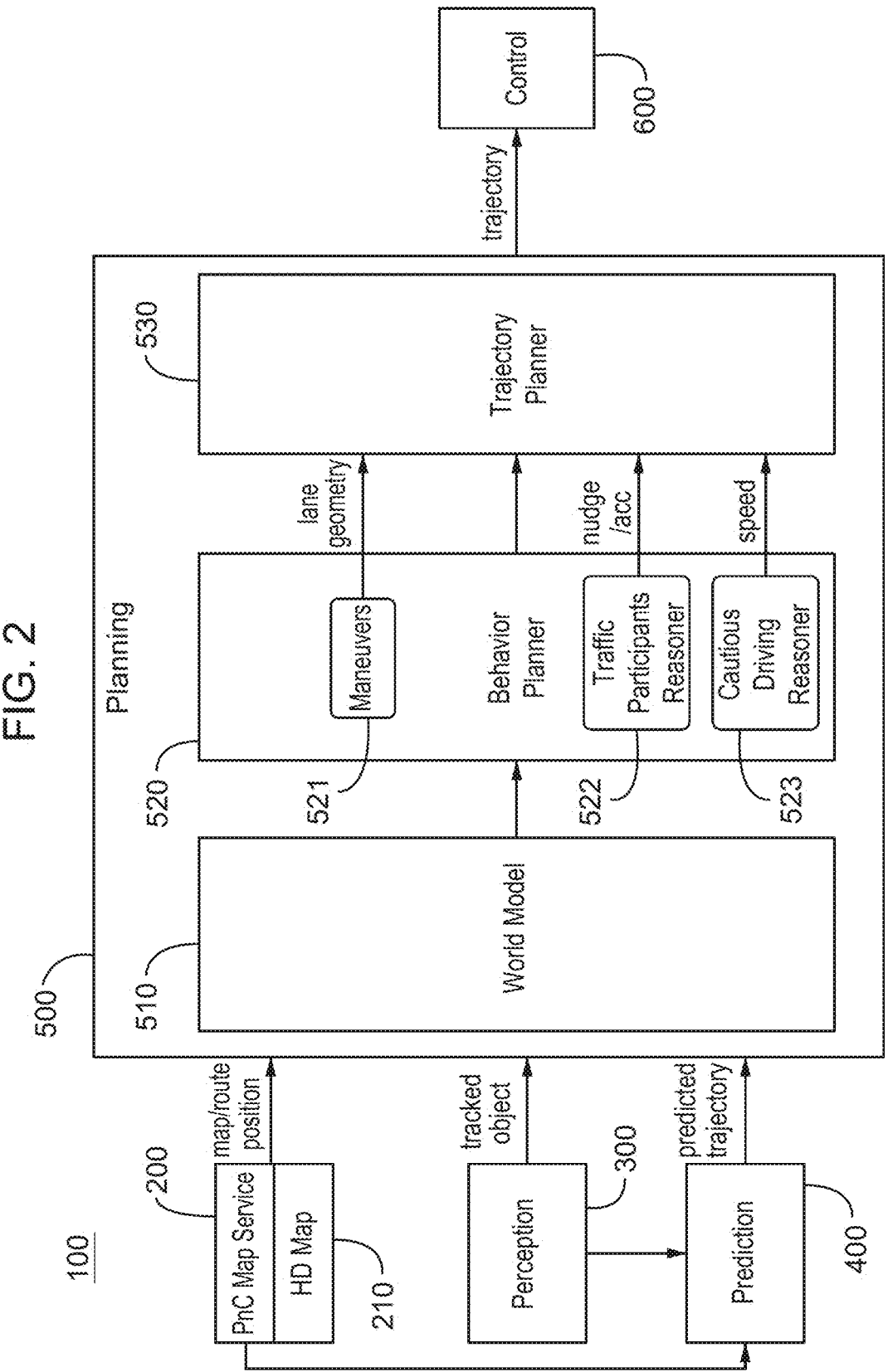
FIG. 2 illustrates a driving system including a cautious driving reasoner in the related art.

FIG. 2 shows modules, sub-modules, and services included in the driving system 100. All the modules and submodules are initialized and remain running once the autonomous vehicle 10 is engaged. These modules, such as the planning module, updates every 100 ms, which means the frequency is 10 Hz.

The driving system 100 includes a planning and control (PnC) map service 200 that provides a data service interface to process queries relating to high-definition map (HD map) information for a region of interest (ROI) in a road network surrounding the vehicle 10 and/or relating to a route that may have been planned and selected by a user through the user interface 70 to a navigation system in the vehicle 10. The PnC map service 200 may include an application programming interface (API) that allows other modules or submodules, such as the prediction module 400 or the planning module 500, to transmit queries to it. A query received by the PnC map service 200 is forwarded to a HD map 210 to obtain high-definition map data responsive to the query. The map data includes digitized elements for various physical features in the region of interest in a road network, such as to identify road boundaries, lanes, centerline dividers between opposing traffic lanes, intersections, road exits, turning lanes, pedestrian crossings, bike lanes, the degree of curvature of roads, and the like. In one embodiment, the HD map data in the HD map 210 is downloaded from server(s), including cloud-based server(s), via the communications device 60. Such downloads allow updates to road changes and road conditions. In another embodiment, the HD map data is integrated or localized with sensor data from the sensor system 50. The sensor system 50 may use light detection and ranging (LiDAR) sensors, radio detection and ranging (RADAR) sensors, infrared cameras, visible light cameras, stereo cameras, an inertial measurement unit (IMU), a global positioning system (GPS), satellite imagery, etc. When integrated with sensor data, the HD map data includes localized data from the sensor system 50 within a range of interest for the sensor system 50. In yet another embodiment, the HD map data may integrate sensor data from a combination of sensor systems, such as from any combination of LiDAR, cameras, satellite imagery, GPS, and/or other sensors in real time. The PnC map service 200 converts the response from the HD map 210 into map data output that could be used by the various modules or submodules submitting the query.

The driving system 100 includes a perception module 300 that performs environment perception. The environment perception obtains and analyzes sensor data from the sensor system 50 to identify and track objects in the ROI in real time. The perception module 300 identifies and tracks objects and features in the environment surrounding the vehicle 10. Objects include traffic signals, other vehicles, pedestrians, obstacles, and/or various other things encountered on the road. The perception module 300 may use an object recognition algorithm, video tracking, and/or other computer vision techniques. The perception module 300 outputs tracked object data to the planning module 500 in real time. The tracked object data may include speed, acceleration, heading, heading acceleration, position, relative distance from vehicle 10, etc. for each tracked object.

The driving system 100 includes a prediction module 400 that predicts how the objects will behave under various scenarios based on tracked object data from the perception module 300 in view of the HD map data returned from the PnC service 200 in response to a query sent from the prediction module 400 to the PnC map service 200. For example, if the current ROI includes an intersection and a tracked object includes a vehicle located at a cross street at the intersection, the prediction module will predict whether the tracked vehicle will likely move straight forward or make a turn. If the combined data from the perception module 300 and the HD map data indicates that the vehicle is in a left or right turn only lane, the prediction module 400 may predict that the vehicle will make a left or right turn respectively. The prediction module 400 may include historical data and scenario data stored in the storage device 40 or in its own separate storage device. Such historical data and scenario data may be pre-processed by a neural network or other artificial intelligence software to create logic and/or neural network pathways that identify a prediction for the trajectory of the tracked object under various scenarios. Such historical data and scenario data, and the data used to train the neural network, may be downloaded via the communications device 60 over a network from a server or servers supporting the prediction module 400 operations. Data from the perception module 300 and from the PnC map service module 200 that are analyzed by the prediction module 400 may also be uploaded to the server(s) to build a historical database supported at the server(s). Some scenarios are discussed below. For example, a non-yield backup prediction is specifically addressed below. The prediction module 400 also generates and outputs a probability value for the associated predicted trajectory of the tracked object to the planning module 500.

The driving system 100 includes a planning module 500 that takes the data from the PnC map service 200, the perception module 300, and the prediction module 400 and generates a final trajectory for the control module 600 to execute for controlling the operation of the vehicle 10.

The planning module 500 includes a world model module 510 that is the first module to initialize in the planning module 500. The world model module 510 handles messages and service requests from other modules to provide a most current snapshot of, including any updates regarding, various driving information about the vehicle 10 and any other traffic participants in the ROI. The world model module 510 may include services and APIs for efficient query handling for downstream modules and reasoners in the planning module 500, such as for the cautious driving reasoner 523 or 524. The world model module 510 provides some of its services by submitting queries to the PnC map service 200.

The planning module 500 includes many modules and submodules, including a behavior planner 520 and a trajectory planner 530. The behavior planner module 520 determines various parameters impacting vehicular behavior, including speed, acceleration/deceleration, lane geometry, passing/following decisions regarding another traffic participant, etc. that is output to a trajectory planner 530.

The behavior planner module 520 includes a maneuvers submodule 521 that generates lane geometry data and lane sequence information. The behavior planner module 520 includes a traffic participants reasoner submodule 522 that determines whether to ignore or not ignore a traffic participant using the driving information regarding the vehicle 10 and the in-lane parameters of the relevant traffic participant. If a determination is made not to ignore the traffic participant, the maneuvers submodule 521 may generate a decision to overtake the traffic participant by using an adjacent lane to pass (a "nudge" decision) or to follow the traffic participant if there is no space in an adjacent lane to pass (an "acc" decision).

The behavior planner module 520 includes a cautious driving reasoner submodule 523 that implements logic to determine whether the prediction output by the prediction module 400 for some dangerous scenario is sufficient to trigger a cautious driving adjustment to driving parameters, such as an adjustment for slowing down and/or braking for the vehicle 10.

The trajectory planner 530 takes various information from its upstream modules and submodules in the planning module 500, including the lane information from the maneuvers submodule 521, the determination from the traffic participants reasoner submodule 522, and the speed determination by the cautious driving reasoner submodule 523, as well as decisions and parameters from other modules and/or submodules in the planning module 500 (not shown) to ultimately generate a trajectory of travel for the vehicle 10.

The driving system 100 includes a control module 600 that controls the movement of the vehicle 10. The planning module 500 outputs a final trajectory and parameters associated therewith to the control module 600. The parameters include speed, acceleration/deceleration, steering, steering wheel angle, steering rate, steering acceleration, odometer information, lateral acceleration, jerk, etc. The control module 600 controls the vehicle 10 using the trajectory and parameters output from the planning module 500.

Returning to the prediction module 400, one type of prediction output from the prediction module 400 to the planning module 500 is for a non-yield backup. FIGS. 3-6 show example scenarios where a non-yield backup prediction may be generated by the prediction module 400.

Figure 3:
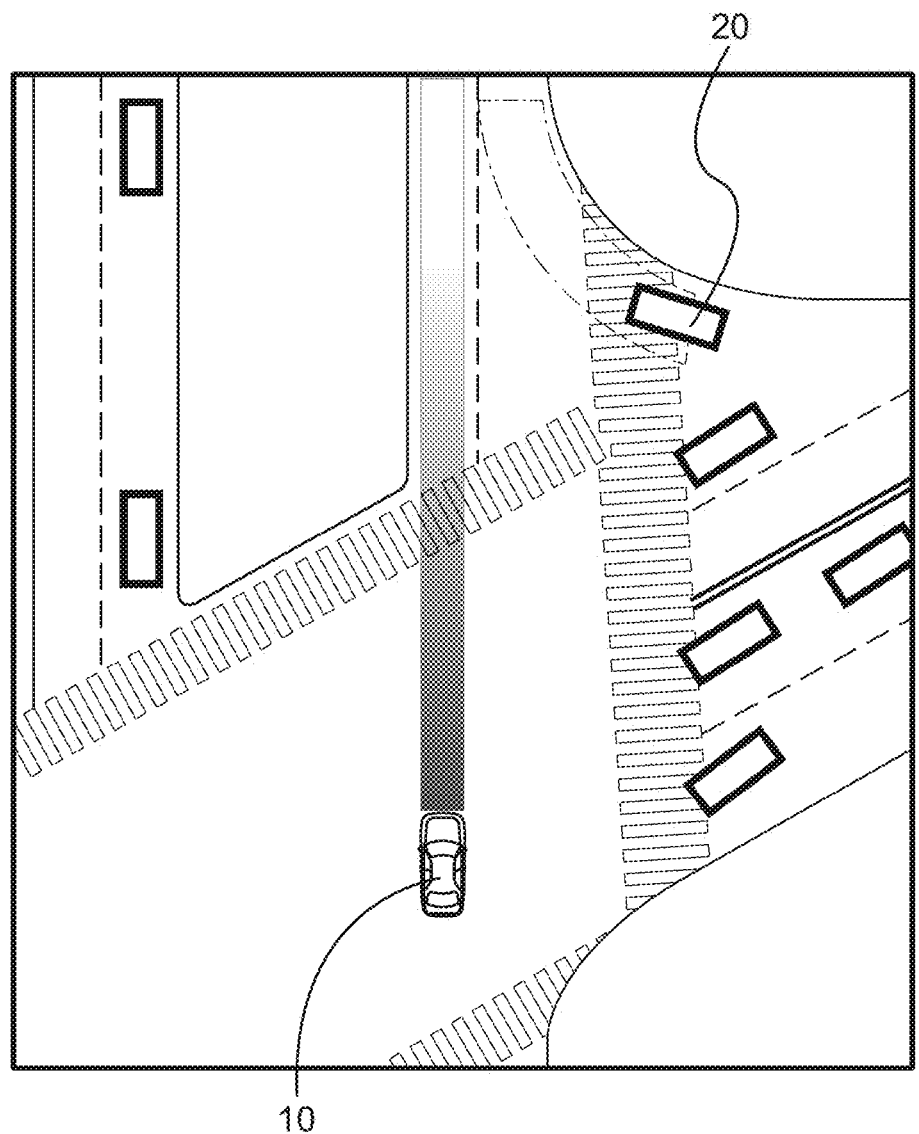
FIG. 3 illustrates an example of a scenario in a region of interest for an autonomous vehicle in which a non-yield backup prediction may be generated by a prediction module.

In FIG. 3, the vehicle 10 is in an intersection in which another vehicle 20 is identified to be at a location in which a turn is predicted. The prediction module 400 not only predicts a turn by the vehicle 20, but also predicts that the vehicle 20 will not yield. Accordingly, the prediction module 400 also predicts a backup condition for the vehicle 10. In other words, a non-yield backup prediction represents a scenario in which the vehicle 20 is predicted to not yield and is predicted to continue to turn into the vehicle 10's lane, such that the vehicle 10 must "backup." A probability value is also output by the prediction module 400 for this non-yield backup prediction. The probability value may represent a likelihood for the non-yield prediction for the vehicle 20 in a predicted trajectory in a particular scenario.

A cautious driving reasoner submodule 523 in the related art has logic that determines that the speed for the vehicle 10 must drop to a default cautious driving speed of 5 m/s or about 11.2 mph given this non-yield backup prediction with a probability value of 0.04. In particular, the cautious driving reasoner submodule 523 in the related art has limited logic that simply focuses on safe driving, in an absolute sense, without any further logic that addresses other factors that may require some adjustment to the straight-forward implementation of a slow-down to 5 m/s or about 11.2 mph under this non-yield backup prediction by the prediction module 400. This is a technological deficiency for the cautious driving reasoner submodule 523 in the related art.

Such limited logic reflects an imbalance with real-world human driving expectations. For instance, in FIG. 3, the vehicle 10 is in the left-most lane, instead of the right-most lane. Human drivers in the left-most lane would not react too much to any turning vehicle 20 that is expected to turn into the right-most lane, if at all. Human drivers would not expect the vehicle 20 to turn into the left-most lane where the vehicle 10 is travelling. The limited implementation logic of the cautious driving reasoner submodule 523 in the related art generates a speed determination for the vehicle 10 to be at a default cautious driving speed of about 11 mph, which ultimately triggers the control module 600 to suddenly slow down the vehicle 10. The abrupt braking and slow down is shown by the dark shading in front of vehicle 10 in FIG. 3 that eventually transitions to white where the default cautious driving speed is predicted to be achieved. In addition, if the traffic light is green for the vehicle 10, a human driver would not expect to slow down suddenly unless some abnormal driving by the vehicle 20 is observed. In contrast, the limited implementation logic of the cautious driving reasoner submodule 523 in the related art nevertheless straightforwardly triggers the vehicle 10 to slow down to about 11 mph. This technological deficiency of the limited logic of the cautious driving reasoner submodule 523 in the related art creates an imbalance with real-world human driving expectations. Such a sudden slow-down of the vehicle 10 triggered by the limited logic of the cautious driving reasoner submodule 523 in the related art may cause another human driver behind the vehicle 10 to rear end the vehicle 10. Alternatively, human drivers behind the vehicle 10 may become frustrated at the sudden slow-down of the vehicle 10 for no apparent reason based on real-world human driving expectations.

Figure 4:
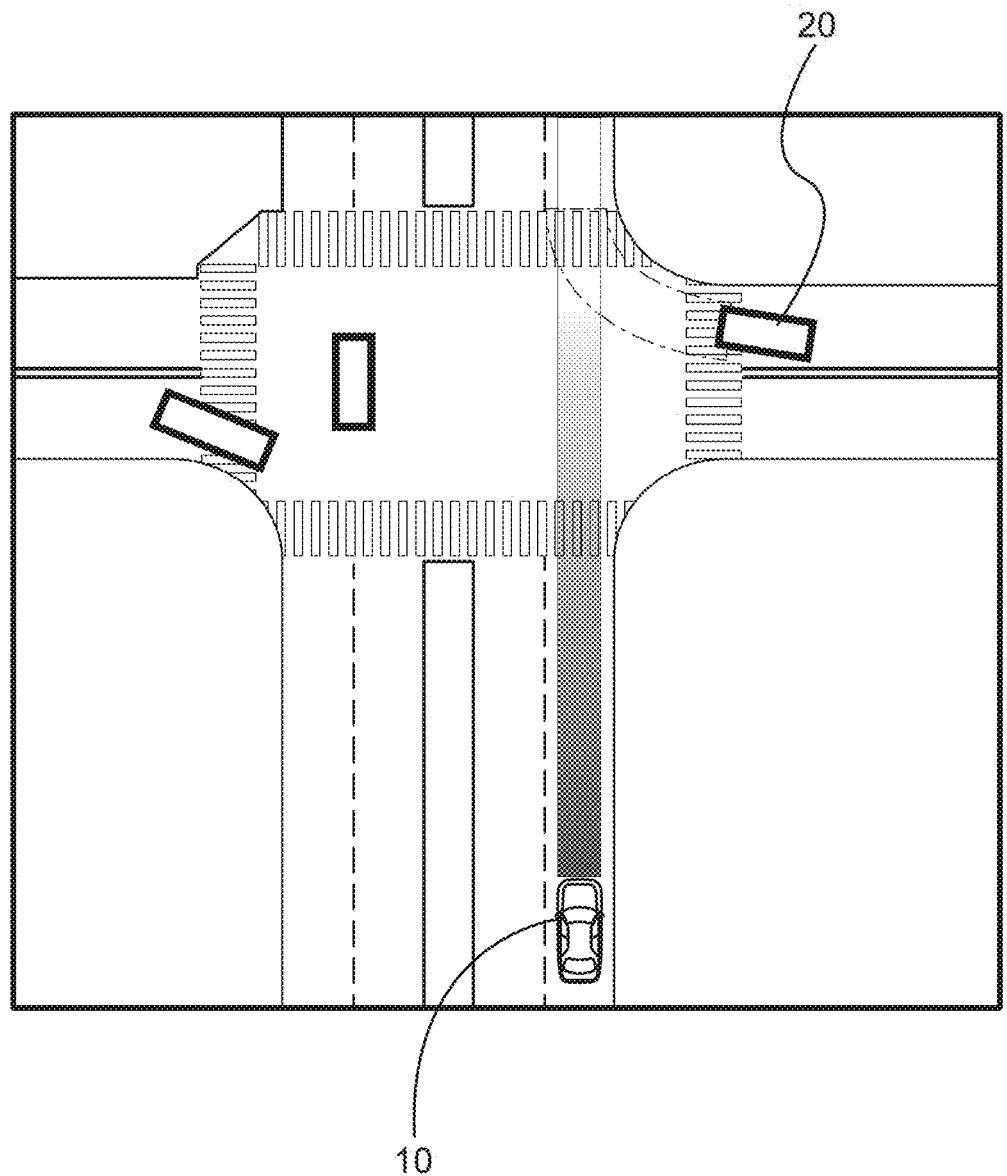
FIG. 4 illustrates another example of a scenario in a region of interest for an autonomous vehicle in which a non-yield backup prediction may be generated by a prediction module.

FIG. 4 shows a scenario where the vehicle 10 is in the right-most lane and the vehicle 20 is off to the right side of its single lane. A human driver may see that the vehicle 20 is pulled off to the right side curb, or may see that the driver of the vehicle 20 is pre-occupied with something else in the car and not looking at the oncoming traffic in anticipation of turning right. While a human driver in vehicle 10 would not expect the vehicle 20 to make a right turn, the prediction module 400 may nevertheless generate a non-yield backup prediction in this scenario.

Figure 5:
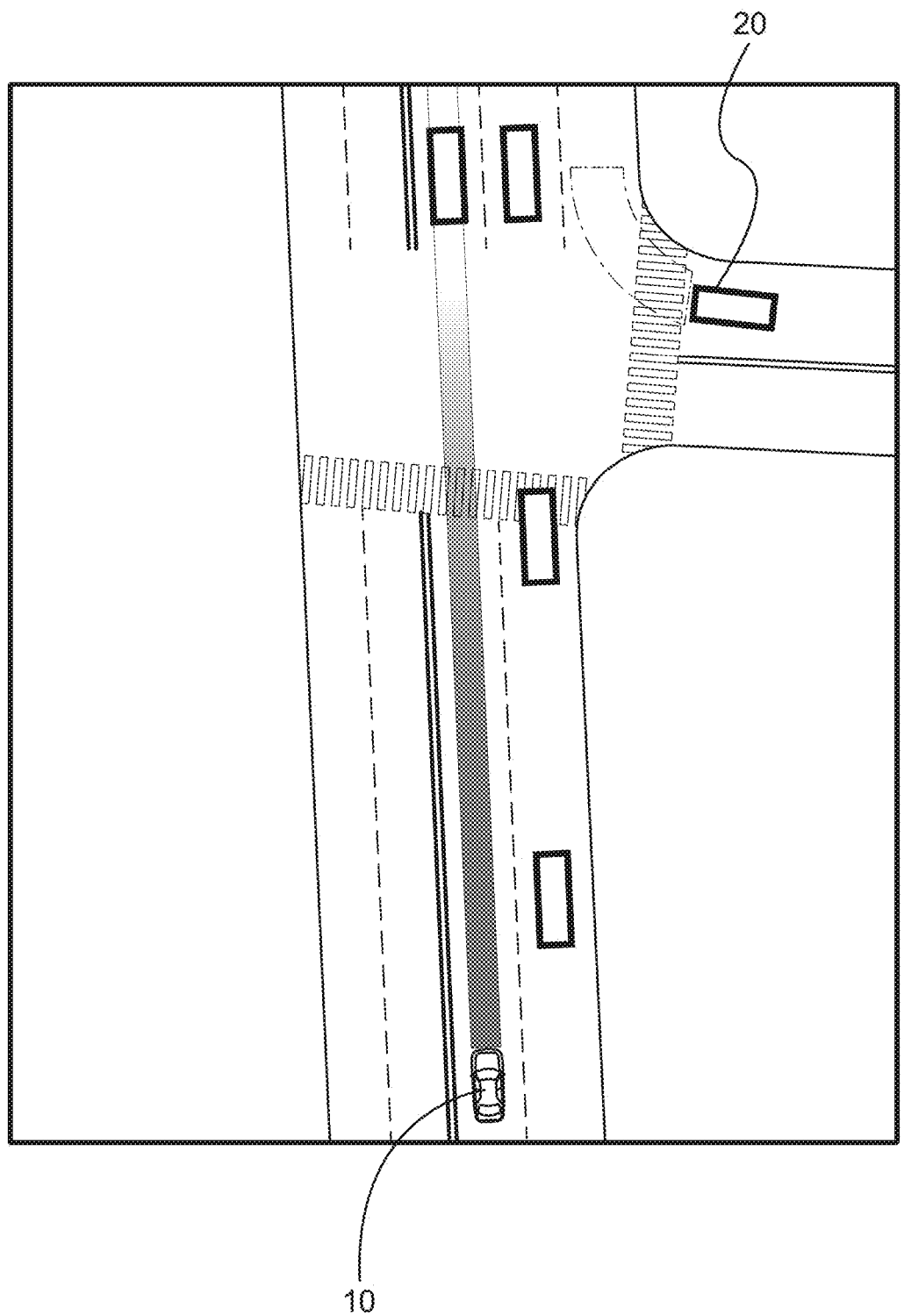
FIG. 5 illustrates yet another example of a scenario in a region of interest for an autonomous vehicle in which a non-yield backup prediction may be generated by a prediction module.

FIG. 5 shows a scenario where the vehicle 10 is in the left-most lane, and other vehicles are in the right-most lane travelling at speed across the intersection. There is a merge lane for turning vehicles to merge into the right-most lane. While other vehicles in the right-most lane are travelling at speed (a non-zero speed of the flow of traffic) despite the vehicle 20 being positioned to turn into the merge lane, the prediction module 400 may nevertheless generate a non-yield backup prediction in this scenario.

Figure 6:
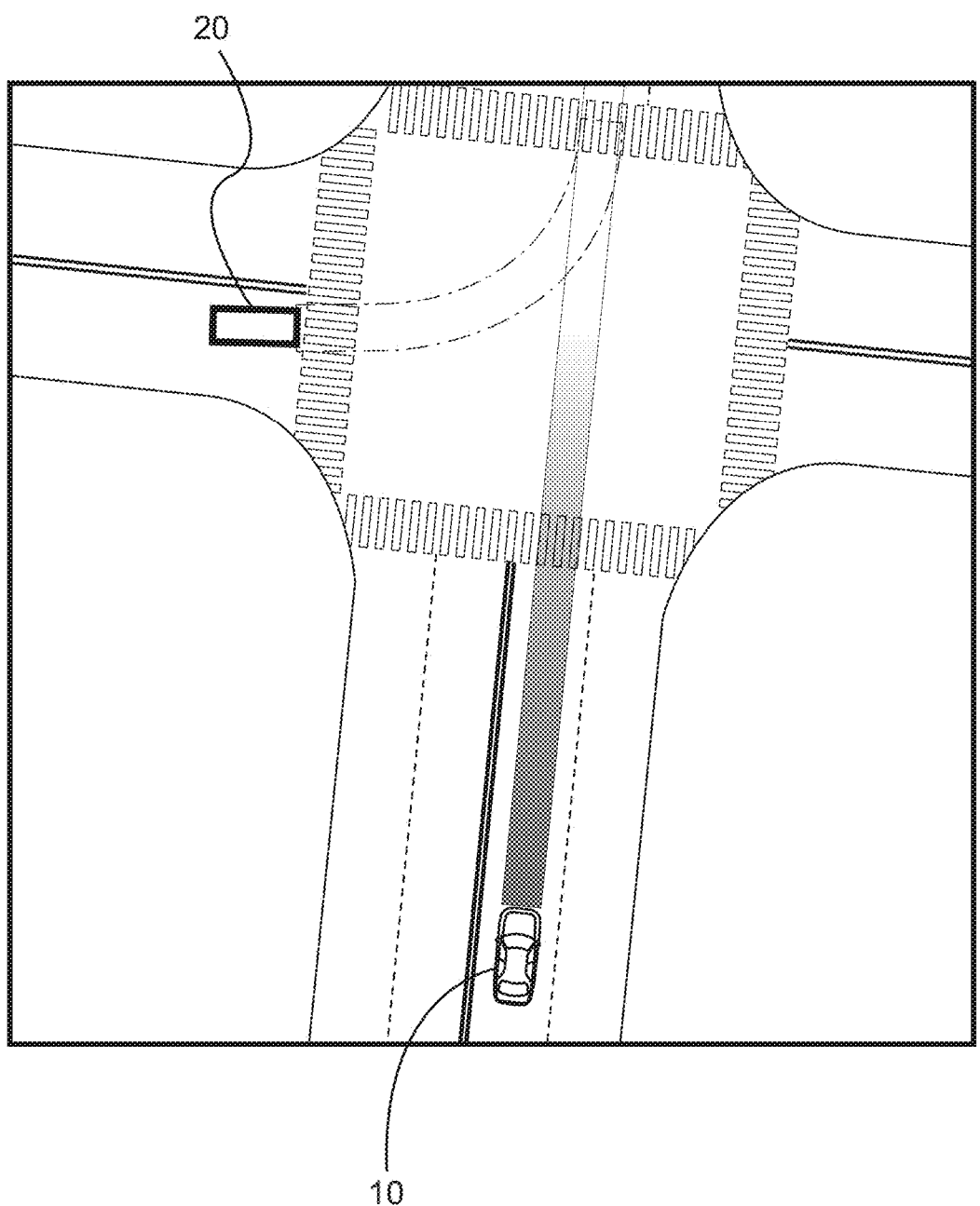
FIG. 6 illustrates a further example of a scenario in a region of interest for an autonomous vehicle in which a non-yield backup prediction may be generated by a prediction module.

FIG. 6 shows a scenario where the vehicle 20 is stopped at the intersection. The vehicle 20 could be stopped in anticipation of making a left turn into the left-most lane where the vehicle 10 is travelling. A human driver might see that the vehicle 20 is stopped or is slowing down to stop, and therefore would not expect the vehicle 20 to proceed to turn left immediately. Nevertheless, the prediction module 400 may generate a non-yield backup prediction in this scenario.

Besides scenarios involving an intersection, the prediction module 400 may generate a non-yield backup prediction for other scenarios. Such other scenarios include an ROI involving a bus stop, multiple parked cars, a group of pedestrians at a crosswalk, road work, road exit, etc.

In each of the scenarios described for FIGS. 4-6, and in other scenarios in which the prediction module 400 may generate a non-yield backup prediction, the cautious driving reasoner submodule 523 in the related art generates a cautious driving speed determination of 5 m/s or about 11 mph that ultimately triggers the control module 600 to suddenly slow down the vehicle 10 to reach the cautious driving target speed of about 11 mph. The abrupt braking and sudden slow down is shown by the dark shading in front of vehicle 10 in these FIGS. 3-6 that eventually transitions to white where the default cautious driving speed is predicted to be achieved. Just like the scenario described for FIG. 3, these scenarios for FIGS. 4-6 also suffer from the technological deficiency of the limited logic of the cautious driving reasoner submodule 523 in the related art because the limited implementation logic in the cautious driving reasoner submodule 523 in the related art reflects an imbalance with real-world human driving expectations and may trigger frustration, traffic congestion, rear-ending of the vehicle 10, and/or other traffic issues by human drivers behind it or around the vehicle 10.

Figure 7:
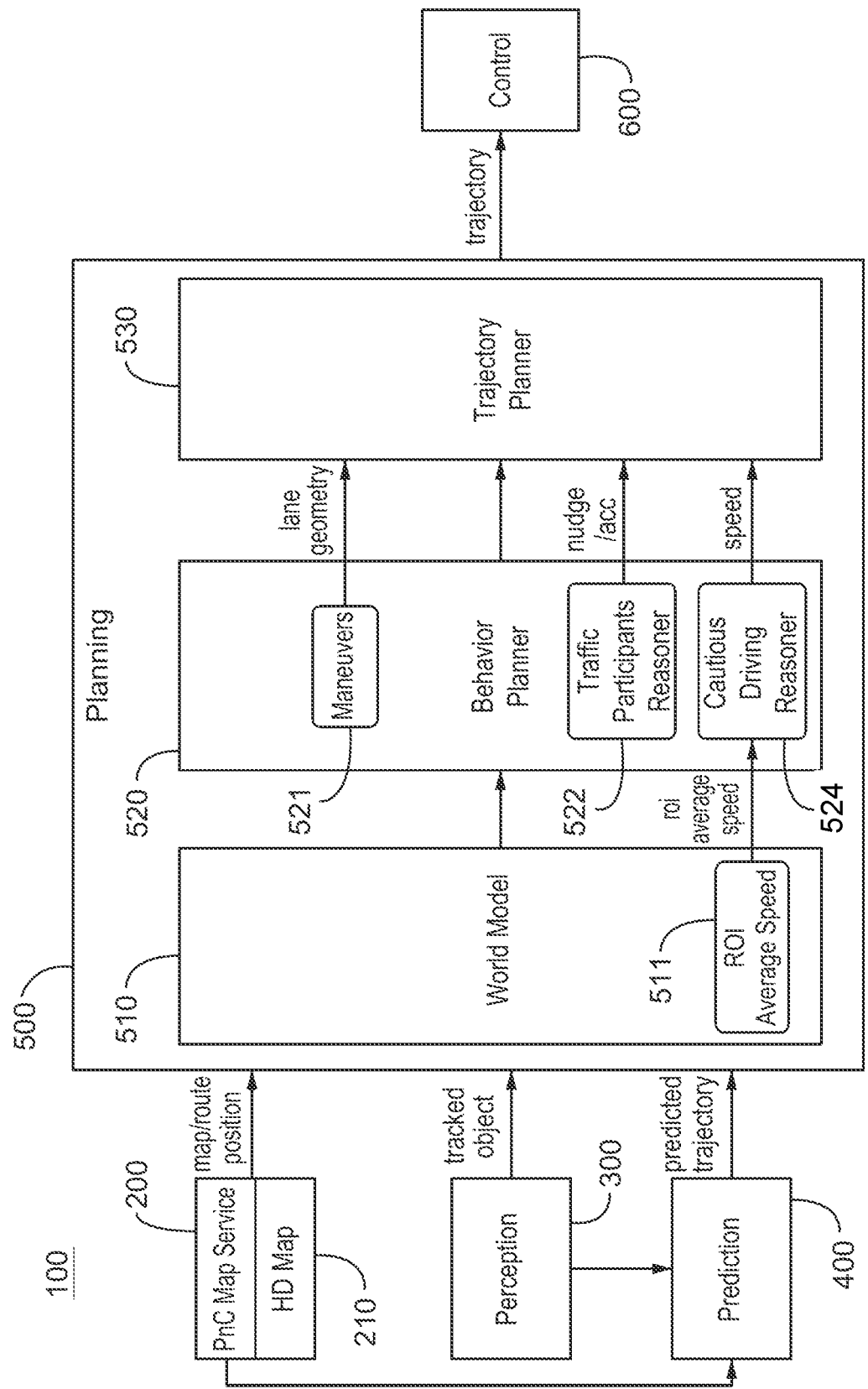
FIG. 7 illustrates a driving system according to an embodiment of the present disclosures.

FIG. 7 shows one embodiment of the present disclosures that solves such issues by providing a driving system 100 including a modified planning module 500 with a ROI Average Speed submodule 511 and a cautious driving reasoner submodule 524.

Figure 8:
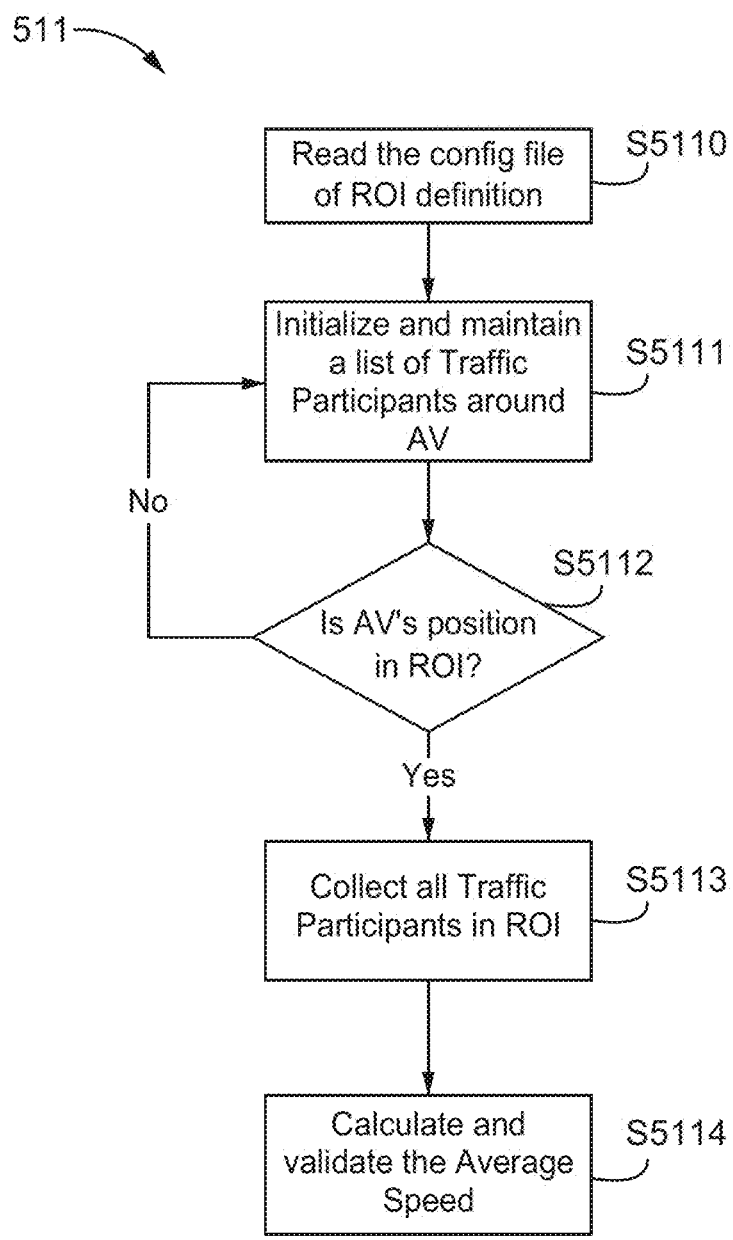
FIG. 8 illustrates a method for a ROI Average Speed module according to an embodiment of the present disclosures.

The ROI Average Speed submodule 511 has an API allowing other modules or submodules to submit queries requesting an average speed for other traffic participants in the ROI involving the vehicle 10. For instance, the cautious driving reasoner submodule 524 may submit a query to the ROI Average Speed submodule 511 to ascertain the average speed of any traffic participants positioned in a vehicle lane in the ROI surrounding the vehicle 10, or if such an average is not available. Upon receiving a query, the ROI Average Speed submodule 511 submits a query to the world model module 510 to identify any traffic participants in the ROI. The ROI Average Speed submodule 511 determines an average speed of any traffic participants in the ROI identified in the latest driving information returned in response to the query to the world model module 510. Traffic participants include any other vehicles located in vehicle lanes identified on a road within the ROI. As long as the traffic participant is in a vehicle lane, its speed is considered. Even for traffic participants that are stopped, such as for an emergency vehicle or police car in its vehicle lane, its speed (even at zero) is considered in calculating the average speed. FIG. 8 shows the method and functions implemented by the ROI Average Speed submodule 511.

When the ROI Average Speed submodule 511 starts, the definition of the ROI is read from a configuration file stored in the storage device 40 at step 55110. The ROI can include various types of zones, such as a school zone, a construction zone, a road work zone, or zones including any particular road feature, such an intersection, a bus stop, a road exit, etc. At step S5111, a list of traffic participants is initialized. This list of traffic participants is used to keep track of all the traffic participants identified to exist within the ROI surrounding the vehicle 10.

At step S5112, based on the ROI defined in the configuration file, whether the vehicle 10 is located within that ROI is determined. If the vehicle 10 is not in the ROI, processing simply returns to initializing the list of traffic participants, until the vehicle 10 is determined to be located within the region of interest.

If, at step S5112, the vehicle 10 is determined to be within the ROI, the ROI Average Speed submodule 511 proceeds to step S5113 to collect driving information relating to any and all the traffic participants identified in the ROI. This collection of driving information may be accomplished by submitting a query to the world model module 510 to identify any traffic participants in the ROI and collecting the driving information included in the response to the query for each of the traffic participants identified. The collected driving information regarding the traffic participants are maintained in the list of traffic participants previously initialized at step S5111. The collected driving information may include the location, speed, acceleration, heading, any heading change, distance from the vehicle 10, etc. for each of the traffic participants.

At step S5114, an average speed of any traffic participants is determined. In this determination, if there are no traffic participants, other than the vehicle 10 itself, the speed limit for the road on which the vehicle 10 is located is used as the average speed. With traffic participant information available, step S5114 proceeds to calculate a traffic participant average speed from the speed associated with the traffic participant(s) that exist. After calculating the traffic participant average speed from available traffic participant information, step S5114 further checks the calculated traffic participant average speed to determine if the calculated traffic participant average speed is greater than a designed speed limit for the autonomous vehicle 10, and if the calculated traffic participant average speed is greater than the speed limit for the road on which the vehicle 10 is located. If the calculated traffic participant average speed is greater than either of these speed limits, the calculated traffic participant average speed is adjusted to be the lesser of the designed speed limit for the vehicle 10 or the road's speed limit. The traffic participant average speed (Traffic Participant Avg Speed) thus determined by step S5114 is output from the ROI Average Speed submodule 511 in response to the query. Alternatively, the output from the ROI Average Speed submodule 511 may be saved in the storage device 40, which is later retrieved by the cautious driving reasoner submodule 524.

Figure 9:
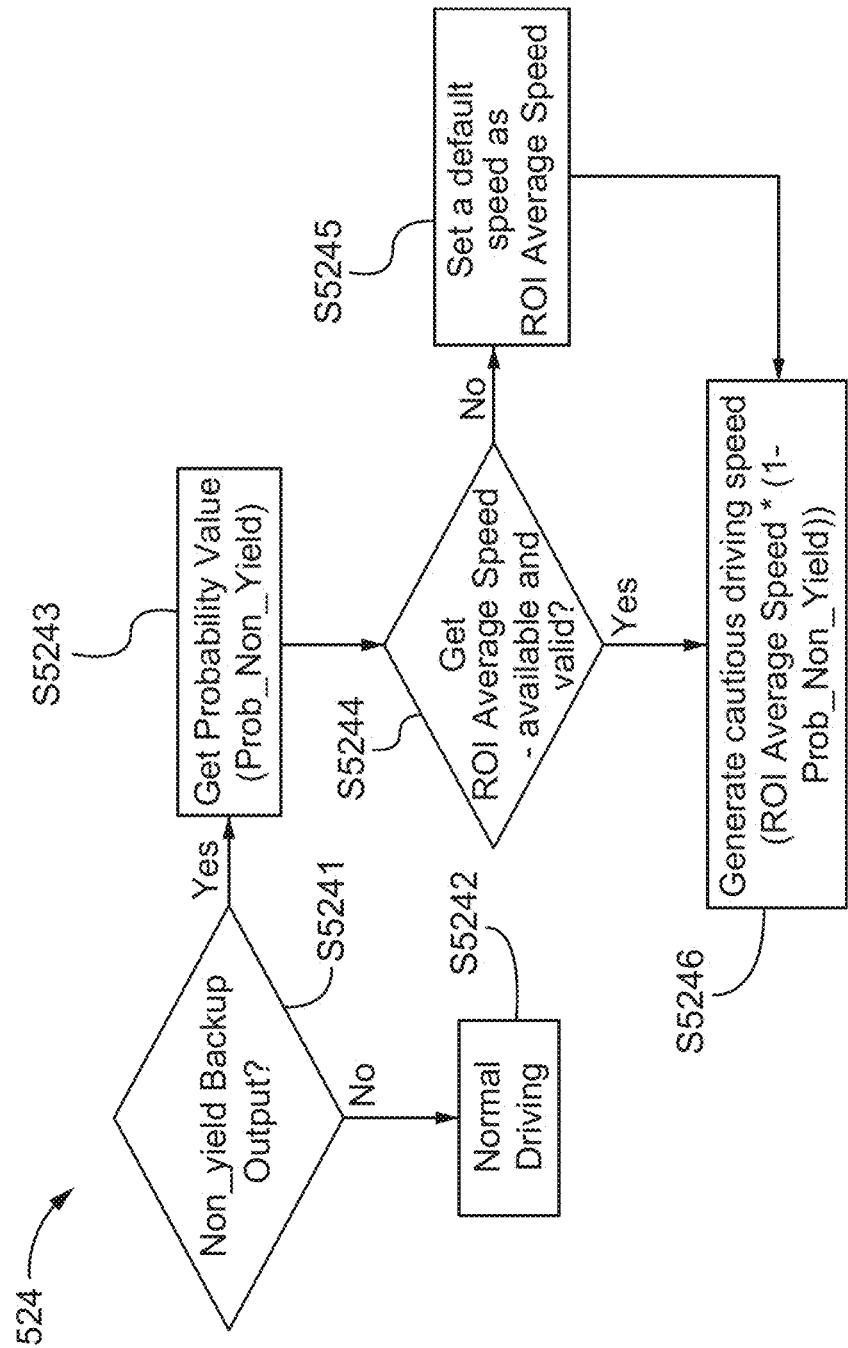
FIG. 9 illustrates a method for a cautious driving reasoner according to an embodiment of the present disclosures.

FIG. 9 shows the method and functions implemented by the cautious driving reasoner submodule 524. At step S5241, the cautious driving reasoner submodule 524 checks if the prediction module 400 generated a non-yield backup prediction as output. If not, normal driving is continued at step S5242.

If a non-yield backup prediction was output by the prediction module 400, then step S5243 obtains the probability value associated with the non-yield backup prediction. A probability value associated with a non-yield backup prediction can be any value greater than zero and less than 1.

After step S5243, step S5244 submits a query to the ROI Average Speed submodule 511 and checks if a traffic participant average speed (Traffic Participant Avg Speed) is available in the response to the query from the ROI Average Speed submodule 511.

If a traffic participant average speed is not available, step S5245 sets a default cautious driving speed to be the traffic participant average speed for use in formula (1) described below. The default cautious driving speed may be a preset value for the autonomous vehicle 10. In one embodiment, the default cautious driving speed is 5 m/s or about 11 mph. Any other low speed value may be preset to be the default cautious driving speed to achieve an objective for cautious driving.

If a traffic participant average speed is available, it may be validated again by checking to ensure that it is a value that is less than the designed speed limit for the vehicle 10.

If the traffic participant average speed is available from the ROI Average Speed submodule 511, step S5246 proceeds to calculate a cautious driving speed value using the following formula (1):

$$\text{Cautious Driving Speed} = \text{Traffic Participant Avg Speed} \times (1 - \text{non-yield probability value}) \quad (1)$$

In an example of a non-yield backup prediction by the prediction module 400, such as for any of the scenarios described in FIGS. 3-6, an example of a non-yield probability value is 0.04 and an example of the Traffic Participant Avg Speed is 30 mph. With these example values for the non-yield probability value and the Traffic Participant Avg Speed, the cautious driving speed (Cautious Driving Speed) determined by the cautious driving reasoner submodule 524 would be 29.1 mph using formula (1), i.e., 30×0.97.

When there is a non-yield backup prediction by the prediction module 400 and the average speed for traffic participants can be determined by the ROI Average Speed submodule 511, the cautious driving reasoner submodule 524 uses the traffic participants average speed to determine the cautious driving speed to be output, instead of simply using a default cautious driving speed. In the scenarios described for FIGS. 3-6 above, the cautious driving reasoner 523 in the related art has limited algorithmic logic that simply outputs a default cautious driving speed of about 11 mph. In comparison, the resulting cautious driving speed output from the cautious driving reasoner submodule 524 of this example is about 29 mph. This avoids a slow down to 11 mph which may be unreasonable in the scenarios of FIGS. 3-6. The cautious driving reasoner submodule 524 of the present embodiment employs the non-yield probability value that is output with the non-yield backup prediction by the prediction module 400 and factors that probability into enhanced logic that applies that probability value (i.e., a reverse probability value of 1 minus the non-yield probability value) to the average speed of traffic participants tracked in the region of interest, using the logic and formula (1) implemented by the cautious driving reasoner submodule 524 described above and shown in FIG. 9. This enhanced implementation logic addresses some real-world driving expectations, reduces the risk of another car behind vehicle 10 rear-ending vehicle 10, and still adheres to cautious driving.

Another advantage of the embodiment described in FIG. 7 is that the ROI Average Speed submodule 511 focuses on particular regions of interest that are definable in the configuration file for any variety of zones, irrespective of particular geographical locations. This avoids the need for any geographical localization to Beijing or San Francisco's Bay Area. Focus on particular regions of interest that include an intersection, a road exit, a school zone, etc., where cautious driving is of particular importance, can be readily addressed via the configuration file.

Yet another advantage of the embodiment described in FIG. 7 is that there is no need to question the correctness of the non-yield backup prediction. Whether the non-yield backup prediction is a true positive or a false positive is irrelevant. The weight of the non-yield probability value that is output with the non-yield backup prediction can also be advantageously used. While the cautious driving reasoner 523 in the related art does not make any use of the non-yield probability value, the cautious driving reasoner 524 of this embodiment does. The value of the non-yield probability is subtracted from 1, to obtain a reverse probability value to apply to the Traffic Participants Avg Speed. So, for a high probability value, for example, 0.60 or higher, the legitimacy of the non-yield situation is presumably high. Subtracting the non-yield probability value from 1.0 (e.g., 1 - 0.60) gives us a lower reverse probability to apply to the Traffic Participants Avg Speed (e.g., 0.40 times the Traffic Participants Avg Speed). Accordingly, formula (1) factors in the significance of the non-yield probability value. A higher non-yield probability value results in a lower reverse probability value being applied to the Traffic Participants Avg Speed. A lower non-yield probability value results in a higher reverse probability value being applied to the Traffic Participants Avg Speed. This is yet another technological improvement over the limited cautious driving logic implementation in the related art because formula (1) reflects a real-world consideration for slowing down more given a higher non-yield probability value and slowing down less given a lower non-yield probability value associated with the non-yield backup prediction generated by the prediction module 400, in combination with a real-world consideration of the average speed of traffic participants within the ROI of the vehicle 10.

While the non-yield probability value described above ranges from 0 to 1, it is not limited to such a range. For instance, the non-yield probability value may be a value between 0 and 100. If the probability value is 25 in that case, the reverse probability value is 75% (or 0.75), a reverse percentage of that non-yield probability value relative to the maximum value of 100 for its range. The cautious driving speed would be the Traffic Participant Avg Speed multiplied by the reverse probability value of 0.75. For any range for the non-yield probability value, the reverse probability value is a reverse percentage of the non-yield probability value relative to a maximum value for the range for the non-yield probability value.

Figure 10:
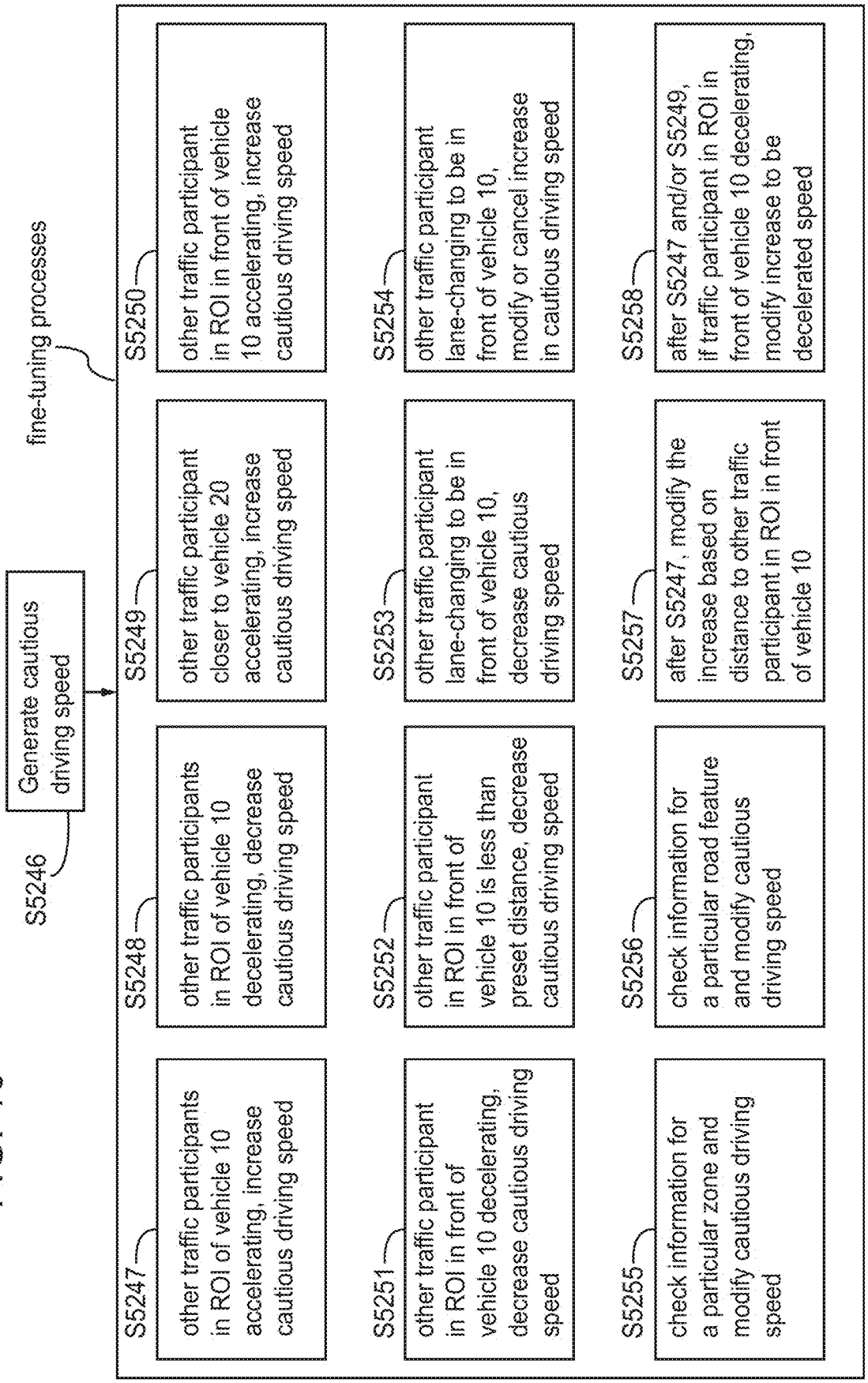
FIG. 10 illustrates fine-tuning processes that may be applied to the cautious driving speed determined at S5246 according to various embodiments of the present disclosures.

In further embodiments of the present application, the cautious driving reasoner submodule 524 may be modified to include further logic to fine-tune the speed determination after step S5246 of FIG. 9. FIG. 10 shows some fine-tuning processes that are further implementation logic to achieve an improvement in the balance between cautious driving and human driving expectations. Any one or combination of any of the various fine-tuning processes may be employed to fine-tune the cautious driving speed determination.

For instance, after the cautious driving speed (Cautious Driving Speed in formula (1) above) is determined by the cautious driving reasoner submodule 524 at step S5246, the cautious driving speed may be further modified based on additional considerations of the behavior of the tracked traffic participants in the ROI of the vehicle 10, such as whether traffic participants are accelerating or decelerating, and/or based on other environmental information, such as whether there is a group of people at a cross intersection. Acceleration or deceleration information may be obtained from queries using the API for the perception module 300, position and in-lane information of traffic participants may be obtained from queries using the API for the world model module 510, and various environmental information, including positions of groups of people, may be obtained from queries using the API for the PnC map service 200.

For example, in the scenario of FIG. 3, the vehicle 10 is in the left-most lane and the traffic participant 20 at the cross intersection appears poised to turn right, thus triggering a non-yield backup prediction by the prediction module 400. The cautious driving reasoner submodule 524 may be further modified to check if there are any traffic participants in the adjacent right-most lane and whether such traffic participants are accelerating or decelerating.

If traffic participants in the right-most lane adjacent the vehicle 10 are all accelerating, despite the non-yield backup prediction, the cautious driving reasoner submodule 524 may be modified to increase the cautious driving speed determined at step S5246. An amount of increase may be determined by applying a preset percentage to the cautious driving speed determined at step S5246. An amount of increase may also be determined by applying the non-yield probability value to the cautious driving speed determined at step S5246. The percentage to be applied is not limited to this, and the amount of increase may be determined in other ways. The cautious driving speed with any such increase may also be limited so as not to exceed the Traffic Participant Avg Speed. This fine-tuning increase adjustment is shown in FIG. 10 as step S5247. This increase adjustment provides an improved implementation for cautious driving that better balances autonomous driving with real world human driving expectations. Accordingly, this fine-tuning S5247 with an increase adjustment to the cautious driving speed determined at step S5246 reflects a further technological improvement over the limited cautious driving logic implementation in the cautious driving reasoner 523 in the related art.

If the traffic participants in the right-most lane adjacent the vehicle 10 are all decelerating, this may lend credence to real-world factors supporting the significance of the non-yield backup prediction by the prediction module 400, despite any potentially low non-yield probability value associated with the non-yield backup prediction. In this case, the cautious driving reasoner submodule 524 may be modified to decrease the cautious driving speed determined at step S5246. An amount of decrease may be determined by applying a preset percentage to the cautious driving speed determined at step S5246. An amount of decrease may also be determined by applying the non-yield probability value to the cautious driving speed determined at step S5246. The percentage to be applied is not limited to this, and the amount of decrease may be determined in other ways. The cautious driving speed with any such decrease may also be limited so as not to drop below the default cautious driving speed. This fine-tuning decrease adjustment is shown in FIG. 10 as step S5248. This decrease adjustment provides an improved implementation for cautious driving that better balances autonomous driving with real world human driving expectations. Accordingly, this fine-tuning S5248 with a decrease adjustment to the cautious driving speed determined at step S5246 reflects a further technological improvement over the limited cautious driving logic implementation in the cautious driving reasoner 523 in the related art.

Alternatively, in another embodiment of the present application, the cautious driving speed determined at step S5246 may also be fine-tuned by checking whether there are any traffic participants, in the ROI of the vehicle 10, within a certain distance to the vehicle 20 at a cross intersection, such as those shown in any of FIGS. 3-6, that is closer to that vehicle 20 at the cross intersection than vehicle 10. If so, and if any such a traffic participant closer to the vehicle 20 is accelerating, despite the non-yield backup prediction, the cautious driving reasoner submodule 524 may be modified to increase the cautious driving speed determined at step S5246. An amount of increase may be determined by applying a preset percentage to the cautious driving speed determined at step S5246. An amount of increase may also be determined by applying the non-yield probability value to the cautious driving speed determined at step S5246. The percentage to be applied is not limited to this, and the amount of increase may be determined in other ways. The cautious driving speed with any such increase may also be limited so as not to exceed the Traffic Participant Avg Speed. This fine-tuning increase adjustment is shown in FIG.

10 as step S5249. This increase adjustment provides an improved implementation for cautious driving that better balances autonomous driving with real world human driving expectations. Accordingly, this fine-tuning S5249 with an increase adjustment to the cautious driving speed determined at step S5246 reflects a further technological improvement over the limited cautious driving logic implementation in the cautious driving reasoner 523 in the related art.

In yet another embodiment of the present application, the cautious driving speed determined at step S5246 may also be fine-tuned by checking whether there is a traffic participant directly in front of the vehicle 10, within the ROI of the vehicle 10. If so, and if the traffic participant in front of vehicle 10 is accelerating, despite the non-yield backup prediction, the cautious driving reasoner submodule 524 may be modified to increase the cautious driving speed determined at step S5246. An amount of increase may be determined by applying a preset percentage to the cautious driving speed determined at step S5246. An amount of increase may also be determined by applying the non-yield probability value to the cautious driving speed determined at step S5246. The percentage to be applied is not limited to this, and the amount of increase may be determined in other ways. The cautious driving speed with any such increase may also be limited so as not to exceed the Traffic Participant Avg Speed. This fine-tuning increase adjustment is shown in FIG. 10 as step S5250. This increase adjustment provides an improved implementation for cautious driving that better balances autonomous driving with real world human driving expectations. Accordingly, this fine-tuning S5250 with an increase adjustment to the cautious driving speed determined at step S5246 reflects a further technological improvement over the limited cautious driving logic implementation in the cautious driving reasoner 523 in the related art.

Alternatively, if there is a traffic participant in front of vehicle 10 and it is decelerating. this may lend credence to real-world factors supporting the significance of the non-yield backup prediction by the prediction module 400, despite any potentially low non-yield probability value associated with the non-yield backup prediction. In this case, the cautious driving reasoner submodule 524 may be modified to decrease the cautious driving speed determined at step S5246. An amount of decrease may be determined by applying a preset percentage to the cautious driving speed determined at step S5246. An amount of decrease may also be determined by applying the non-yield probability value to the cautious driving speed determined at step S5246. The percentage to be applied is not limited to this, and the amount of decrease may be determined in other ways. The cautious driving speed with any such decrease may also be limited so as not to drop below the default cautious driving speed. This decrease adjustment provides an improved implementation for cautious driving that better balances autonomous driving with real world human driving expectations. This fine-tuning decrease adjustment is shown in FIG. 10 as step S5251. Accordingly, this fine-timing S5251 with a decrease adjustment to the cautious driving speed determined at step S5246 reflects a further technological improvement over the limited cautious driving logic implementation in the cautious driving reasoner 523 in the related art.

In yet another fine-tuning process, if the traffic participant in front of the vehicle 10 is at a preset distance from vehicle 10 or less, the cautious driving reasoner submodule 524 may be modified to decrease the cautious (hiving speed determined at step S5246. An amount of decrease may be determined by applying a preset percentage to the cautious driving speed determined at step S5246. An amount of decrease may also be determined by applying the non-yield probability value to the cautious driving speed determined at step S5246. The percentage to be applied is not limited to this, and the amount of decrease may be determined in other ways. The cautious driving speed with any such decrease may also be limited so as not to drop below the default cautious driving speed. This fine-tuning decrease adjustment is shown in FIG. 10 as step S5252. This fine-tuning S5252 decrease adjustment provides an improved implementation for cautious driving that better balances autonomous driving with real world human driving expectations. Accordingly, this fine-tuning S5252 with a decrease adjustment to the cautious driving speed determined at step S5246 reflects a further technological improvement over the limited cautious driving logic implementation in the cautious driving reasoner 523 in the related art.

In a further embodiment, the cautious driving speed determined at step S5246 may also be fine-tuned by checking whether there is a traffic participant making a lane change from an adjacent lane into the lane the vehicle 10 is located in and in front of the vehicle 10. By querying the world model module 510, a heading and a heading change speed may be obtained for any traffic participant in any adjacent lane. By comparing the heading and heading change speed with a preset threshold, a lane change for a traffic participant in an adjacent lane into the lane of and in front of the vehicle 10 may be determined. If a lane change determination is made, the cautious driving speed determined at step S5246 may be decreased to avoid getting too close to the lane-changing traffic participant. The amount of decrease may be a preset percentage of the cautious driving speed, or may be a varying percentage of the cautious driving speed depending on a distance between the vehicle 10 and the anticipated location of the lane-changing traffic participant. This fine-tuning decrease adjustment is shown in FIG. 10 as step S5253. This fine-tuning S5253 decrease adjustment provides an improved implementation for cautious driving that better balances autonomous driving with real world human driving expectations. Accordingly, this fine-tuning S5253 decrease adjustment to the cautious driving speed determined at step S5246 reflects a further technological improvement over the limited cautious driving logic implementation in the cautious driving reasoner 523 in the related art.

In yet another embodiment, for any of the above alternatives involving a fine-tuning that increases the cautious driving speed determined at step S5246, the cautious driving reasoner submodule 524 may be further modified to change or cancel that increase for the cautious driving speed based on lane change activity by traffic participants in an adjacent lane. By querying the world model module 510 to obtain a heading and a heading change speed for any traffic participant in any adjacent lane and comparing the heading and heading change speed with a preset threshold, a lane change for a traffic participant in an adjacent lane into the lane of and in front of the vehicle 10 may be determined. If a lane change determination is made, any fine-tuning increase for the cautious driving speed determined at step S5246 may be modified or canceled. The amount of modification of the increase in the cautious driving speed may be determined by applying a preset percentage to the cautious driving speed determined at step S5246. Alternatively, if a lane change determination is made, any fine-tuning increase may be canceled if a distance to a predicted position in front of the vehicle 10 is less than a preset threshold. This fine-tuning modification/cancelation adjustment is shown in FIG. 10 as step S5254. This modification/cancelation S5254 of a fine-tuning increase adjustment provides an improved implementation for cautious driving that better balances autonomous driving with real world human driving expectations. Accordingly, this modified fine-timing S5254 of an increase adjustment to the cautious driving speed determined at step S5246 reflects a further technological improvement over the limited cautious driving logic implementation in the cautious driving reasoner 523 in the related art.

While some embodiments described above may involve a cross intersection, the present application is not limited to cross intersections. Other scenarios may include a school zone, a construction zone, a road work zone, or zones including any particular road feature, such an intersection, a bus stop, a road exit, etc. With different scenarios with various zones and road features, other embodiments of the present application may further fine-tune the cautious driving speed determined at step S5246 by checking information related to such zones and road features and modifying the cautious driving speed determined at step S5246. This fine-tuning modification adjustment is shown in FIG. 10 as steps S5255 and S5256.

For example, in another embodiment of the present application, the cautious driving reasoner submodule 524 may be modified to include further logic to fine-tune the speed determination after step S5246 of FIG. 9 to include checking if the ROI of the vehicle 10 involves a school zone and limiting the cautious driving speed to be not more than a reduced speed limit for the school zone.

Further embodiments of the present application may be different combinations of the various fine-tuning embodiments described above. For example, while an embodiment described above increases the cautious driving speed when other traffic participants in an adjacent lane are accelerating, this increase may be further fine-tuned and adjusted in combination with another embodiment described above that considers the distance between the vehicle 10 and a traffic participant in front of the vehicle 10 and reduces the increase amount based on the distance to a traffic participant in front of the vehicle 10. This is shown in step S5257 in FIG. 10. Alternatively, the fine-tuning embodiment that increases the cautious driving speed due to other traffic participants in an adjacent lane accelerating may be combined with another embodiment described above that considers whether a traffic participant in front of the vehicle 10 is decelerating and reduces the increase amount such that the resulting cautious driving speed is commensurate to the decelerated speed of the traffic participant in front of the vehicle 10. This is shown in step S5258 in FIG. 10. These examples are not intended to be limiting, and other combinations of the various fine-tuning embodiments and various alternatives may be made.

Figure 11:
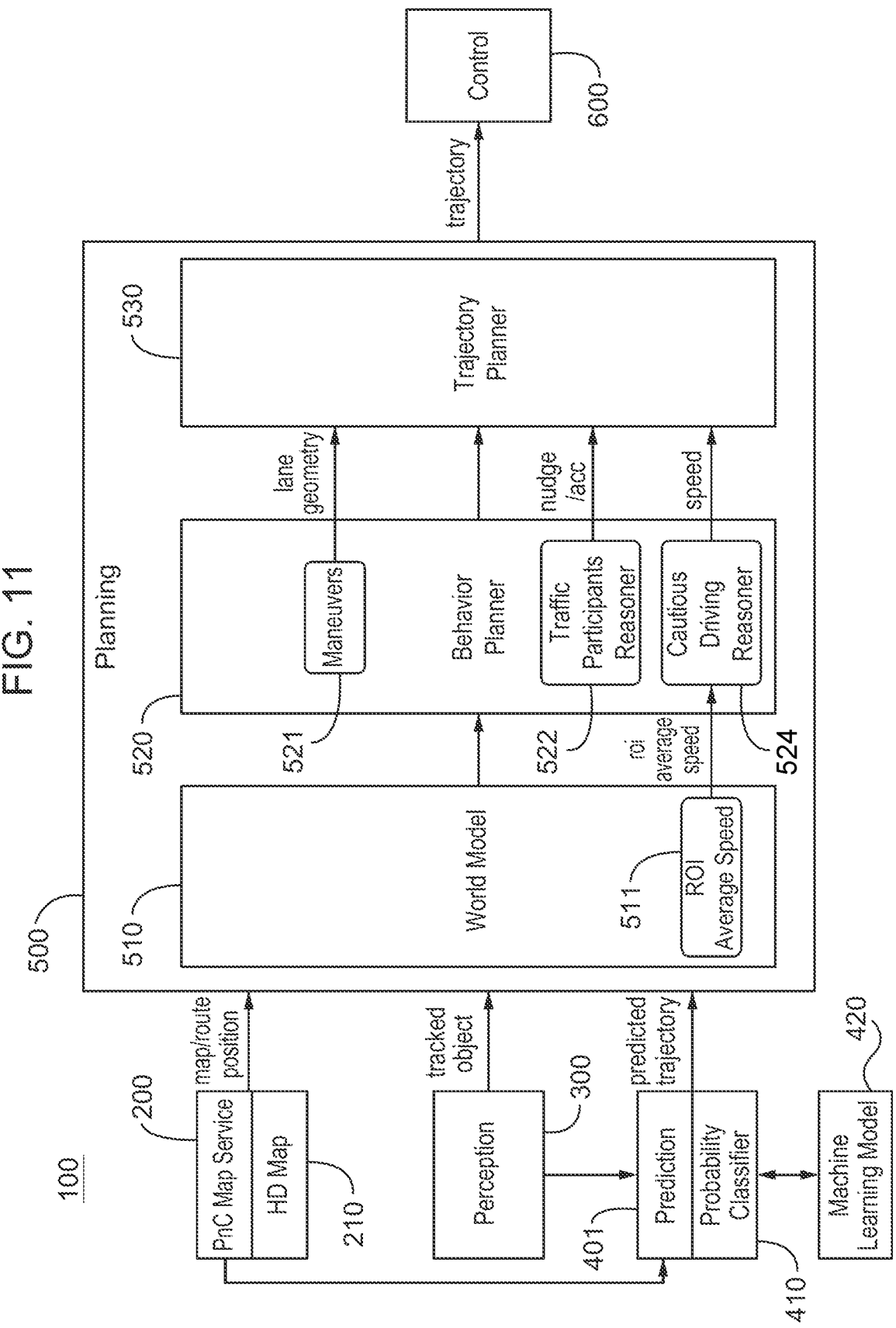
FIG. 11 illustrates another driving system according to an embodiment of the present disclosures.

Another embodiment of the present application is shown in FIG. 11, including a prediction module 401. The prediction module 401 includes a probability classifier submodule 410. Before the prediction module 401 outputs a non-yield backup prediction to the planning module 500, the probability classifier submodule 410 compares the non-yield probability value with a threshold. The threshold may be preset. If the non-yield probability value is equal to or less than the threshold, the non-yield backup prediction is negated and cancelled. For example, if the threshold is 0.05, all non-yield back-up predictions having a non-yield probability value equal to or less than 0.05 are negated and cancelled. This improves the efficiency of the autonomous driving processing in the driving system 100 by bypassing the downstream processing for cautious driving speed determination.

Alternatively, instead of simply comparing to a threshold, further scenario learning and use of a machine learning model may be applied. In FIG. 11, the probability classifier submodule 410 stores scenarios where non-yield backup predictions are determined, including the non-yield probability value associated with each non-yield backup prediction. The stored scenarios in which non-yield backup predictions are generated are transmitted to a machine learning model 420. The stored scenarios are analyzed, and model scenarios may be identified as representative of legitimate non-yield back-up predictions. Such model scenarios may be used to train the machine learning model 420 to identify legitimate non-yield backup scenarios. After training, additional non-yield backup scenarios may be further analyzed and validated as being legitimate, whereby new model scenarios identifying legitimate non-yield backup scenarios and any non-yield backup scenarios recognized to be non-legitimate may be used to re-train the machine learning model 420. Such a trained machine learning model 420 may be used to supplement the threshold comparison by the prediction module 401 to weed out non-legitimate non-yield backup predictions. Alternatively, the use of the machine learning model 420 may simply obviate or replace the threshold comparison by the prediction module 401. The use of a machine learning model 420 is not intended to be limiting. The use of alternative neural networks to achieve the same objectives may be employed.

Detailed exemplary embodiments are disclosed herein. Specific structural and functional details disclosed herein are not to be interpreted as limiting, but merely as exemplary. Further, the terms and phrases used herein are not intended to be limiting, but rather, provide an understandable description of possible implementations. In some of the embodiments described above, various functions are described to be performed in various modules and sub-modules. However, functions, subsets of functions, services, and subsets of services disclosed herein for various modules and submodules are not to be interpreted as limiting, but merely as exemplary. Functions, subsets of functions, services, and subsets of services disclosed herein may be performed in a different module or submodule, or organized differently across different modules or submodules. Various functions, subsets of functions, services, or subsets of services may be organized in various module, modules, submodule, submodules, one or more of the modules, sub-modules, or services without departing from the scope of the features and language recited in the claims.

What is claimed is:

1. A computer-implemented method for autonomous driving comprising:
receiving, from a driving system including one or more hardware processors onboard an autonomous vehicle, a non-yield backup prediction for the vehicle regarding a traffic participant in a region of interest in a road network surrounding the vehicle, the non-yield backup prediction including a non-yield probability value for the traffic participant not yielding to the vehicle;
obtaining, from a sensor system onboard the vehicle, driving information for other traffic participants surrounding the vehicle within the region of interest, the driving information including a speed of each of the other traffic participants;
determining, by the driving system, an average speed of the other traffic participants;
determining, by the driving system, a cautious driving speed for the vehicle by calculating a reverse probability value and multiplying the average speed of the other traffic participants by the reverse probability value, the reverse probability value being a reverse percentage of the non-yield probability value relative to a maximum value for the non-yield probability value; and
with a speed of the vehicle being greater than the cautious driving speed, controlling, by the driving system, the vehicle to reduce the speed of the vehicle to the cautious driving speed.

2. The computer-implemented method for autonomous driving according to claim 1, further comprising, after the determining of the cautious driving speed, determining, by the driving system, that the other traffic participants include an acceleration, and increasing the cautious driving speed by a preset percentage.

3. The computer-implemented method for autonomous driving according to claim 1, further comprising, after the determining of the cautious driving speed, determining, by the driving system, that the other traffic participants include a deceleration, and decreasing the cautious driving speed by a preset percentage.

4. The computer-implemented method for autonomous driving according to claim 1, further comprising, after the determining of the cautious driving speed, determining, by the driving system, that at least one of the other traffic participants is positioned in front of the vehicle, with a distance between the at least one of the other traffic participants and the vehicle being equal to or less than a threshold distance, and decreasing the cautious driving speed by a preset percentage.

5. The computer-implemented method for autonomous driving according to claim 1, further comprising, after the determining of the cautious driving speed, determining, by the driving system, that at least one of the other traffic participants in an adjacent lane is making a lane change into a lane the vehicle is located and in front of the vehicle, and decreasing the cautious driving speed by a preset percentage.

6. The computer-implemented method for autonomous driving according to claim 1, wherein with the average speed of the other traffic participants being greater than a maximum driving speed of the vehicle or greater than a speed limit for a roadway the vehicle is located, the average speed is modified, by the driving system, to be the lesser of the maximum driving speed or the speed limit.

7. An autonomous vehicle comprising:
a sensor system obtaining sensed information regarding objects in a region of interest in a road network surrounding the vehicle, the objects including traffic participants; and
a driving system including one or more hardware processors executing instructions to perform:
receiving a non-yield backup prediction for the vehicle regarding a traffic participant sensed by the sensor system in the region of interest in the road network surrounding the vehicle, the non-yield backup prediction including a non-yield probability value for the traffic participant not yielding to the vehicle,
obtaining, from the sensor system, driving information for other traffic participants surrounding the vehicle within the region of interest, the driving information including a speed of each of the other traffic participants,
determining an average speed of the other traffic participants,
determining a cautious driving speed for the vehicle by calculating a reverse probability value and multiplying the average speed of the other traffic participants by the reverse probability value, the reverse probability value being a reverse percentage of the non-yield probability value relative to a maximum value for the non-yield probability value, and
with a speed of the vehicle being greater than the cautious driving speed, controlling the vehicle to reduce the speed of the vehicle to the cautious driving speed.

8. The autonomous vehicle according to claim 7, wherein, after the determining of the cautious driving speed, the driving system determines that the other traffic participants include an acceleration, and increases the cautious driving speed by a preset percentage.

9. The autonomous vehicle according to claim 7, wherein, after the determining of the cautious driving speed, the driving system determines that the other traffic participants include a deceleration, and decreases the cautious driving speed by a preset percentage.

10. The autonomous vehicle according to claim 7, wherein, after the determining of the cautious driving speed, the driving system determines that at least one of the other traffic participants is positioned in front of the vehicle, with a distance between the at least one of the other traffic participants and the vehicle being equal to or less than a threshold distance, and decreasing the cautious driving speed by a preset percentage.

11. The autonomous vehicle according to claim 7, wherein, after the determining of the cautious driving speed, the driving system determines that at least one of the other traffic participants in an adjacent lane is making a lane change into a lane the vehicle is located and in front of the vehicle, and decreasing the cautious driving speed by a preset percentage.

12. The autonomous vehicle according to claim 7, wherein, with the average speed of the other traffic participants being greater than a maximum driving speed of the vehicle or greater than a speed limit for a roadway the vehicle is located, the driving system modifies the average speed to be the lesser of the maximum driving speed and the speed limit.

13. A non-transitory computer readable medium storing instructions that, when executed by one or more processors, cause the one or more processors to:
receive a non-yield backup prediction for an autonomous vehicle regarding a traffic participant in a region of interest in a road network surrounding the vehicle, the non-yield backup prediction including a non-yield probability value for the traffic participant not yielding to the vehicle;
obtain, from a sensor system onboard the vehicle, driving information for other traffic participants surrounding the vehicle within the region of interest, the driving information including a speed of each of the other traffic participants;
determine an average speed of the other traffic participants;
determining a cautious driving speed for the vehicle by calculating a reverse probability value and multiplying the average speed of the other traffic participants by the reverse probability value, the reverse probability value being a reverse percentage of the non-yield probability value relative to a maximum value for the non-yield probability value; and
with a speed of the vehicle being greater than the cautious driving speed, control the vehicle to reduce the speed of the vehicle to the cautious driving speed.

14. The non-transitory computer readable medium according to claim 13, wherein the one or more processors are further caused to, after the determining of the cautious driving speed, determine that the other traffic participants include an acceleration, and increase the cautious driving speed by a preset percentage.

15. The non-transitory computer readable medium according to claim 13, wherein the one or more processors are further caused to, after the determining of the cautious driving speed, determine that the other traffic participants include a deceleration, and decrease the cautious driving speed by a preset percentage.

16. The non-transitory computer readable medium according to claim 13, wherein the one or more processors are further caused to, after the determining of the cautious driving speed, determine that at least one of the other traffic participants is positioned in front of the vehicle, with a distance between the at least one of the other traffic participants and the vehicle being equal to or less than a threshold distance, and decrease the cautious driving speed by a preset percentage.

17. The non-transitory computer readable medium according to claim 13, wherein the one or more processors are further caused to, after the determining of the cautious driving speed, determine that at least one of the other traffic participants in an adjacent lane is making a lane change into a lane the vehicle is located and in front of the vehicle, and decrease the cautious driving speed by a preset percentage.

18. The non-transitory computer readable medium according to claim 13, wherein the one or more processors are further caused to, with the average speed of the other traffic participants being greater than a maximum driving speed of the vehicle or greater than a speed limit for a roadway the vehicle is located, modify the average speed to be the lesser of the maximum driving speed and the speed limit.

* * * * *